US007694667B2

(12) United States Patent
Williams et al.

(10) Patent No.: US 7,694,667 B2
(45) Date of Patent: Apr. 13, 2010

(54) APPARATUS FOR A VEHICLE

(75) Inventors: Danny Williams, Grandchester (AU); Andrew Mueller, Grandchester (AU)

(73) Assignee: Richwood Creek Pty Ltd., Grandchester Qld (AU)

( * ) Notice: Subject to any disclaimer, the term of this patent is extended or adjusted under 35 U.S.C. 154(b) by 0 days.

(21) Appl. No.: 11/503,490

(22) Filed: Aug. 11, 2006 (Under 37 CFR 1.47)

(65) Prior Publication Data

US 2007/0169762 A1 Jul. 26, 2007

(51) Int. Cl.
*F02B 33/00* (2006.01)
*F02B 25/00* (2006.01)

(52) U.S. Cl. .............................. 123/559.1; 123/65 BA

(58) Field of Classification Search ............. 123/559.1, 123/65 BA
See application file for complete search history.

(56) References Cited

U.S. PATENT DOCUMENTS 1,625,597 A * 4/1927 Fornaca .................. 123/559.1
1,967,069 A * 7/1934 Shoemaker ............. 123/65 BA
2,021,204 A * 11/1935 Schneider .............. 123/65 BA
2,111,282 A * 3/1938 Edwards ................ 123/65 BA
2,164,451 A * 7/1939 Fast ...................... 123/65 BA
2,382,244 A * 8/1945 Lundquist et al. ...... 123/184.34
2,400,581 A * 5/1946 Walker ...................... 417/237
2,963,006 A * 12/1960 Karde ..................... 123/559.1
3,077,189 A * 2/1963 Earnshaw et al. ....... 123/65 BA
3,540,421 A * 11/1970 Boyce, Jr. et al. ....... 123/65 BA
4,480,968 A * 11/1984 Duerr ..................... 123/65 BA
4,576,126 A * 3/1986 Ancheta ................. 123/65 BA
5,085,199 A * 2/1992 Sado et al. ............... 123/559.1
5,101,794 A * 4/1992 Van Blaricom ......... 123/65 BA
5,143,028 A 9/1992 Takahashi ............... 123/65 BA
5,911,211 A * 6/1999 Uchida .................... 123/559.1
6,029,637 A * 2/2000 Prior ....................... 123/559.1
6,619,275 B2 * 9/2003 Wiik ....................... 123/559.1
6,837,195 B2 * 1/2005 Suwazono ............... 123/559.1
6,918,804 B2 * 7/2005 Matsuda .................. 123/559.1
7,011,079 B2 * 3/2006 Park ........................ 123/559.1

FOREIGN PATENT DOCUMENTS

RU 2158373 10/2000
WO 9305289 3/1993
WO 2006099668 9/2006

OTHER PUBLICATIONS

International Search Report for PCT/AU2006/000377 mailed Apr. 19, 2006. (2 pages).
International Preliminary Report on Patentability for PCT/AU2006/000377 issued Sep. 25, 2007. (1 page).
Written Opinion of the International Search Authority for PCT/AU2006/000377 mailed Apr. 19, 2006. (3 pages).
Derwent Abstract 2001-121818/13 for RU2158373, Oct. 27, 2000. (2 pages).

* cited by examiner

*Primary Examiner*—Thai Ba Trieu
(74) *Attorney, Agent, or Firm*—Meyertons, Hood, Kivlin, Kowert & Goetzel, P.C.; Eric B. Meyertons

(57) ABSTRACT

An apparatus for a vehicle comprising a compressor and manifold for connection to air inlets of an engine, wherein the manifold has an entry end chamber and the compressor device is located at least partially within the chamber.

33 Claims, 5 Drawing Sheets

80 35a 31 36a 36 80 37 35 34 39 30 32 34b 38 35b 42 45 46 41 40 43 33 44 100

141 130 145 146 134 133 136 147 137 135 142 70 139 138 132 140 100

APPARATUS FOR A VEHICLE

BACKGROUND OF THE INVENTION

The present invention relates to an internal combustion engine such as in vehicles and in a particular form relates to a supercharger for an internal combustion engine.

FIELD OF THE INVENTION

To enhance the performance and/or economy of an engine one option is to increase the amount of air which is forced into engine cylinders. The greater the amount of air which is provided to the cylinder, the greater the amount of fuel which can be introduced which means that you get more power and torque from the combustion within the cylinder.

Superchargers and turbo chargers are forced induction devices which compress air flowing into the engine and thus allow more fuel to be burned.

A supercharger derives its power from the engine directly through a driving system which may include a gear or belt, in the same manner as the water pump or alternator.

The supercharger is connected to the inlet manifold which routes air to the intake which connects to the inlets of each cylinder of the engine.

A typical V-engine configuration for a supercharger and manifold is shown in FIG. 1 and a typical in-line engine configuration is shown in FIG. 2.

A problem with connecting a supercharger 11 with an inlet manifold 12, 13 as exemplified in FIGS. 1 and 2 is the availability of space in the engine compartment of the vehicle. Because the supercharger 11 connects to the inlet end of inlet manifold 12, 13, the supercharger 11 necessarily fouls with the bonnet/hood of the vehicle.

This would not meet with design standards or be a result acceptable to vehicle owners. In addition as shown in FIGS. 1 and 2 the supercharger 11 needs to be fixed to the inlet of the inlet manifold regardless of the size or configuration of the inlet manifold.

The present invention provides an apparatus for incorporating a supercharger or other forced air injection system in a vehicle.

Preferably the invention provides an alternative to persons and or parties wishing to supercharge an engine whilst maintaining the bonnet or hood profile, utilising the given space within the confines of the engine and or engine compartment area, for engines.

SUMMARY OF THE INVENTION

According to one aspect of the present invention there is provided an apparatus for a vehicle comprising a compressor device and manifold for connection to air inlets of an engine, wherein the manifold has an entry end chamber and the compressor device is located at least partially within the chamber.

Important optional features of the present invention will now be described in the following paragraphs up to the Brief Description of the Drawings.

Preferably the compressor device is integrally connected with the manifold.

The apparatus may include at least one common wall which partitions compressor lobes of the compressor from an intake passage of the manifold.

The apparatus may comprise a first and second common wall.

Preferably at least one common wall is curved.

Preferably the compressor device comprises a supercharger or turbo charger.

The supercharger preferably comprises a compression chamber with compressor rotors located therein or any other device capable of compressed air delivery.

Preferably the supercharger comprises a pair of compressor rotors each with compressor lobes/blades.

Preferably the supercharger comprises compression chamber walls.

The compression chamber walls may include the common walls.

The common walls may comprise first and second walls.

The supercharger may have an outlet located between the first and second common walls.

The first and second common walls may have outer ends which oppose each other.

Each outer end may be located below the respective central axis of rotation of the compressor rotors.

The outlet may comprise an opening at a lower part of the entry end chamber.

The shafts of each compressor rotor may be located inside the entry end chamber.

According to one aspect of the present invention there is provided a vehicle incorporating the apparatus in an engine compartment, the apparatus being located below the hood or bonnet of the engine compartment.

The outlet may comprise an opening to a lower part of the entry end chamber.

Preferably the axles of each compressor rotor are located inside the entry end chamber.

Preferably the first and second common walls are located adjacent a lower wall of the entry end chamber.

Preferably the entry end chamber comprises a discharge diffuser.

The first and second common walls may terminate in outer ends which face each other.

Preferably the outlet gap located between the outer ends of the common walls has a width which is less than the distance between the centres of each compressor rotor.

The width of the outlet gap is preferably less than half the distance between the centres of the compressor rotors.

An upper wall of the supercharger rotors may be an upper wall of the entry end chamber.

Preferably at least one common wall creates a passage for air flow with an opposing wall of the manifold.

The outlet gap may be located above a substantially horizontal wall section of the entry end chamber.

According to one embodiment the entry end chamber may have a plurality of exit passages leading to an exit outlet for connection to air intakes of an engine.

According to one embodiment the exit passages diverge in opposite directions.

According to another embodiment the exit passages extend in the same direction.

The cross-sectional area of the entry end chamber according to one embodiment is greater than the cross-sectional area of the/each exit passage.

According to another embodiment the lower wall of the entry end chamber is generally concave.

According to one embodiment for an in-line engine, it is preferred that the top of the supercharger is located below the top end of the engine cylinder head or block.

According to a further embodiment of the present invention the entry end chamber comprises an enlarged area diffuser, the diffuser may incorporate the chambers base as with the in valley V type configuration or as with the inverted V configuration or inline configuration may incorporate both the diffuser and the intake hood or bonnet from the throttle to the device's intake area, being top or rear. The diffuser preferably comprises passages extending from the outlet of the rotor compartment of the compressor device around part of the outer wall of the rotor compartment and the air inlet passage leading to the cylinders of the engine.

Preferably the apparatus comprises a compressor device compartment.

The compressor device compartment is preferably located in a central region of the apparatus.

According to a preferred embodiment of the invention the compressor device is located in a central region of the manifold and has an outlet in an upper, side or lower wall which opens into a central chamber which leads to air intake ports for cylinders of the engine.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

BRIEF DESCRIPTION OF THE DRAWINGS

Preferred embodiments of the present invention will now be described by way of example only with reference to the accompanying drawings in which.

DETAILED DESCRIPTION OF THE DRAWINGS

Figure 1:
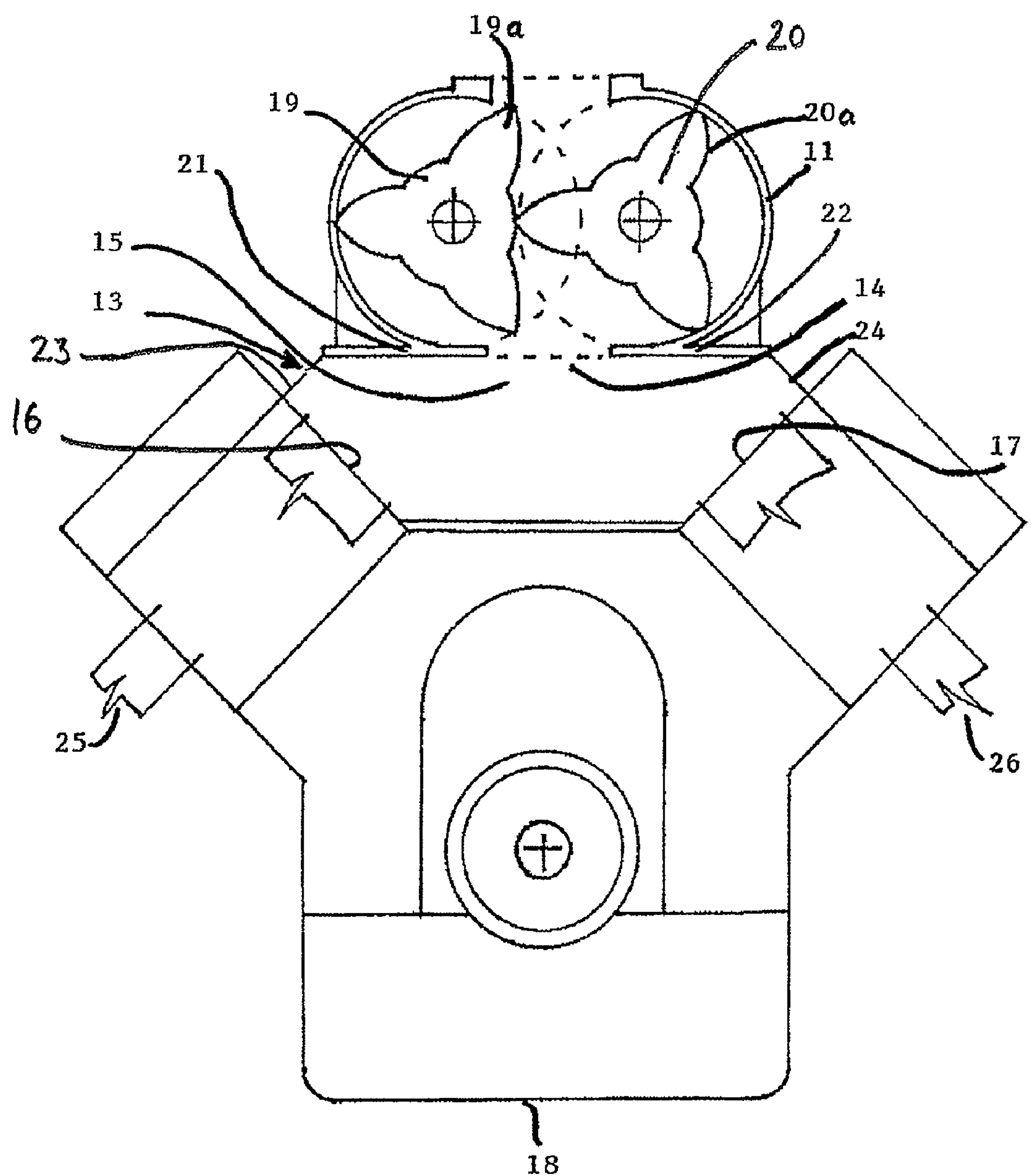
FIG. 1 shows an existing V-engine configuration incorporating a supercharger and inlet manifold.

FIG. 1 shows a prior art V-engine configuration of a supercharger 11 connected directly to an entry section 14 located at the top of the inlet manifold 13 and in the centre thereof.

The central section 15 of manifold 13 consists of a generally horizontally extending passage which diverges downwardly at each end into inlet passages 16, 17.

It should be noted that depending upon the number of cylinders for the engine there will be parallel configurations of inlet passages 16, 17. The outer ends of each of these passages 16, 17 connect to the air intakes of the cylinders of the engine 18.

From FIG. 1 it can be seen how the supercharger, which consists of a pair of compressor rotors 19, 20 having rotor cores 19*a*, 20*a*, is located well above the top of the engine 18. Thus if the bonnet or hood of the vehicle housing the engine was located approximately level with the bottom section of the supercharger, the top of the supercharger 11 would protrude above the level of the bonnet.

It is also noted that the outlet of the compressor 11 consists of an opening in the bottom of the supercharger which feeds directly into the opening 14 of the manifold 13 and is aligned by connecting bottom walls 21, 22 of the supercharger with opposing top walls 23, 24 of the manifold 13.

The exhaust manifolds from the engine are shown as items 25, 26.

Figure 3:
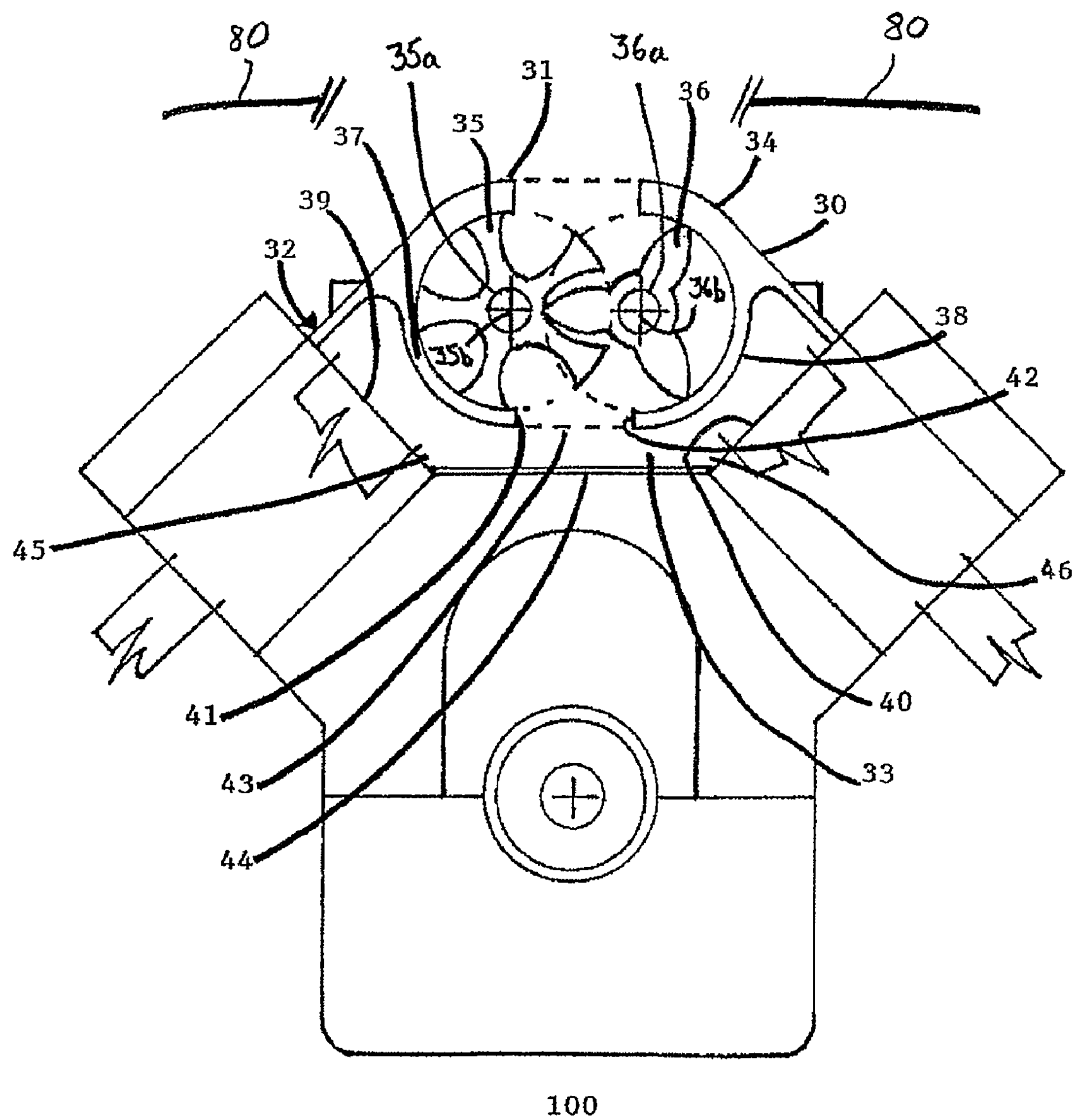
FIG. 3 shows a V-engine configuration of an apparatus incorporating a supercharger and manifold in accordance with a first embodiment of the present invention.

FIG. 3 shows a V-engine configuration in which an apparatus 30 in accordance with one embodiment of the invention is provided for direct connection to the air intake of the engine.

The apparatus 30 consists of a supercharger 31 which is integrated with a manifold 32. The manifold 32 is larger than manifold 13 so that a central inlet chamber 33 is created incorporating supercharger 30.

Top wall 34 of the supercharger 30 forms the top wall of the manifold 32 and chamber 33.

Compressor rotors 35, 36 within the compressor are fixed on shafts or axels 35*a*, 36*a*, which provide axes of rotation 35*b*, 36*b*, for rotors 35,36 and associated lobes. The shafts or axels 35*a*, 36*a* are located in a central region of the chamber 33. Side walls 37, 38 of the compressor 30 act as common walls for the compressor 30 and manifold 32 and serve to segregate the rotor lobes 35, 36 from inlet passages 39, 40 of the manifold 32.

The side walls 37, 38 curve around the bottom of the compressor rotors 35, 36 and terminate in ends 41, 42 which oppose each other and create an outlet gap 43 at the bottom of the compressor 30 which feeds to the bottom of the chamber 33.

The ends 41, 42 are located typically between the vertical positions of the shafts of the compressor rotors 35, 36. The exact size of the gap 43 and points of termination of ends 41, 42 depends upon air compression required, engine size, inlet passage size, etc.

The bottom wall 44 of the chamber 33 is generally flat as in the existing V-engine configuration manifold 13. However it may also be distended, or of alternative configurations.

The common walls 37, 38 create a small passage 45, 46 between the bottom of the lower ends of the walls 37 and the bottom wall 44 of chamber 33.

These passages 45, 46 increase in cross-sectional area before entering the inlet passages 39, 40.

The result of the above configuration is that compressed air from the supercharger passes downwardly through the gap 43 to the bottom of the chamber 33 and out through the passages 45, 46 into passages 39, 40.

Because the supercharger 31 is located at least partially within the chamber 33, rather than being set above it, the supercharger 31 can, at least in preferred embodiments, be located below a hood or bonnet 80 of an engine compartment of a vehicle.

Figure 5:
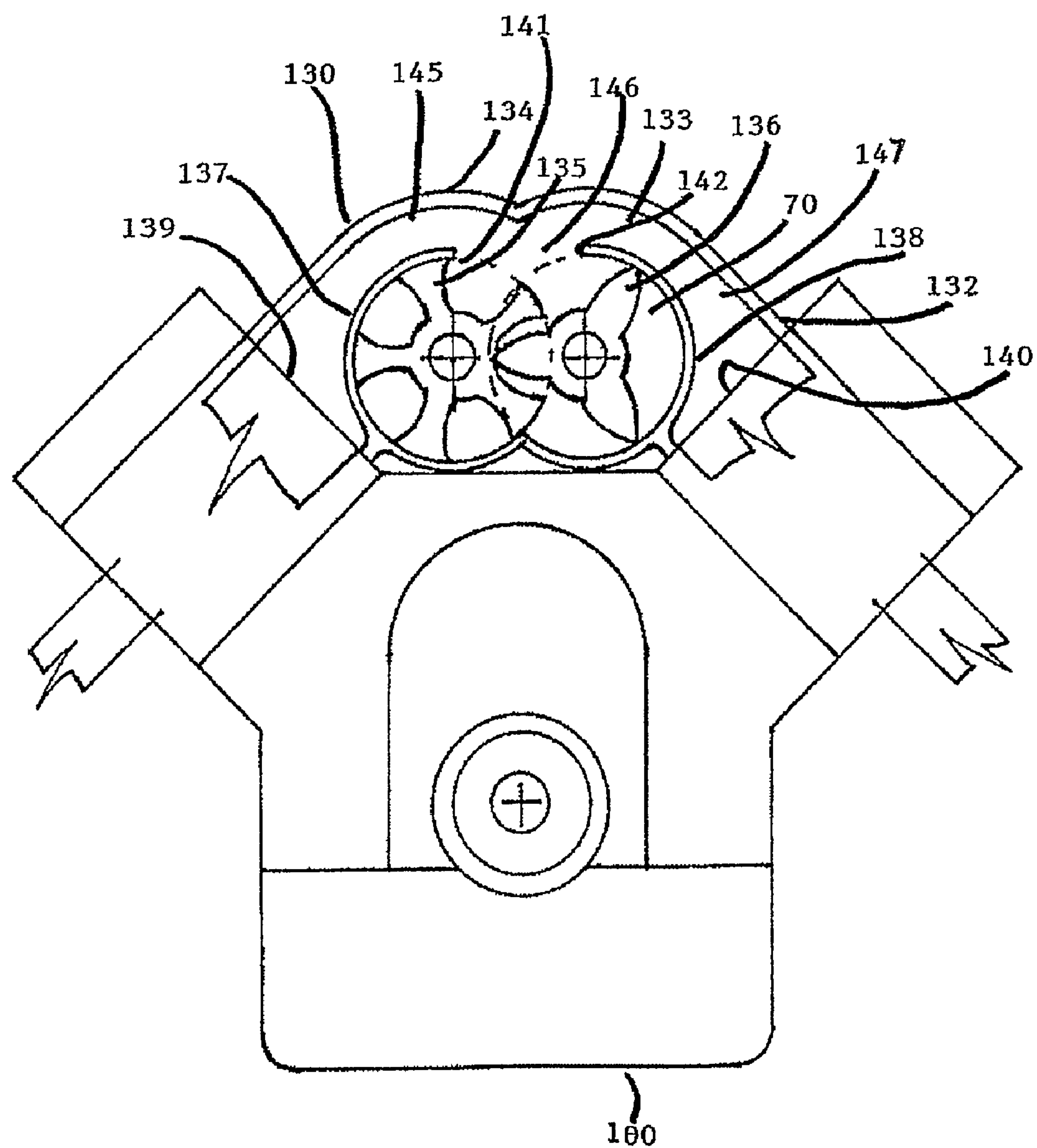
FIG. 5 shows a V engine configuration of an apparatus incorporating a supercharger and manifold in accordance with another embodiment of the present invention.

As shown in FIG. 5 an alternative configuration is provided for the supercharger within the apparatus 130. In contrast to the apparatus 30 shown in FIG. 3, the rotors 135 and 136 are located in a compartment 70 located at the bottom of the chamber 133.

The air intake for the supercharger is at one end of the apparatus 130.

The compartment 70 is defined by partition walls 137 and 138. These walls are joined at their lower ends and extend upwardly and terminate in outer ends 141, 142. A gap 146 between these end walls form the outlet to chamber 133.

Top wall 134 extends above the rotor compartment 70 and curves in opposite directions from a mid point of the apparatus downwardly to the inlet passages 139, 140.

Thus in contrast to the apparatus shown in FIG. 3 the apparatus shown in FIG. 5 produces an air flow from the supercharger rotor compartment 70 initially upwardly through the gap 146 and then in opposite directions through the chamber 133 through the respective passages 145, 147 and into the inlet/intake passages 139, 140.

In both FIGS. 3 and 5 the engine is designated by numeral 100.

Figure 2:
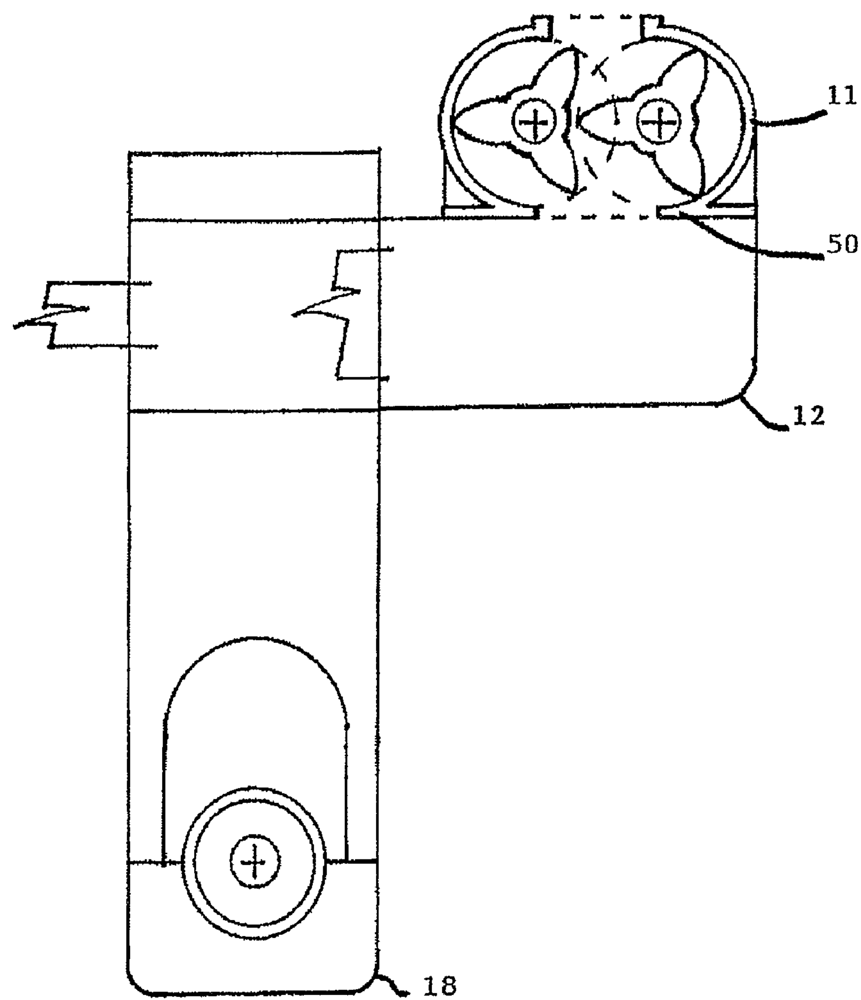
FIG. 2 shows an existing in-line engine configuration incorporating a supercharger and inlet manifold.

FIG. 2 shows supercharger 11 connected to an inlet flange 50 of inlet manifold 12 for an in-line engine configuration. As with the V-engine configuration the supercharger 11 because it is located on top of the inlet manifold protrudes beyond the engine compartment through a hole created in the vehicle compartment hood of the vehicle.

Figure 4:
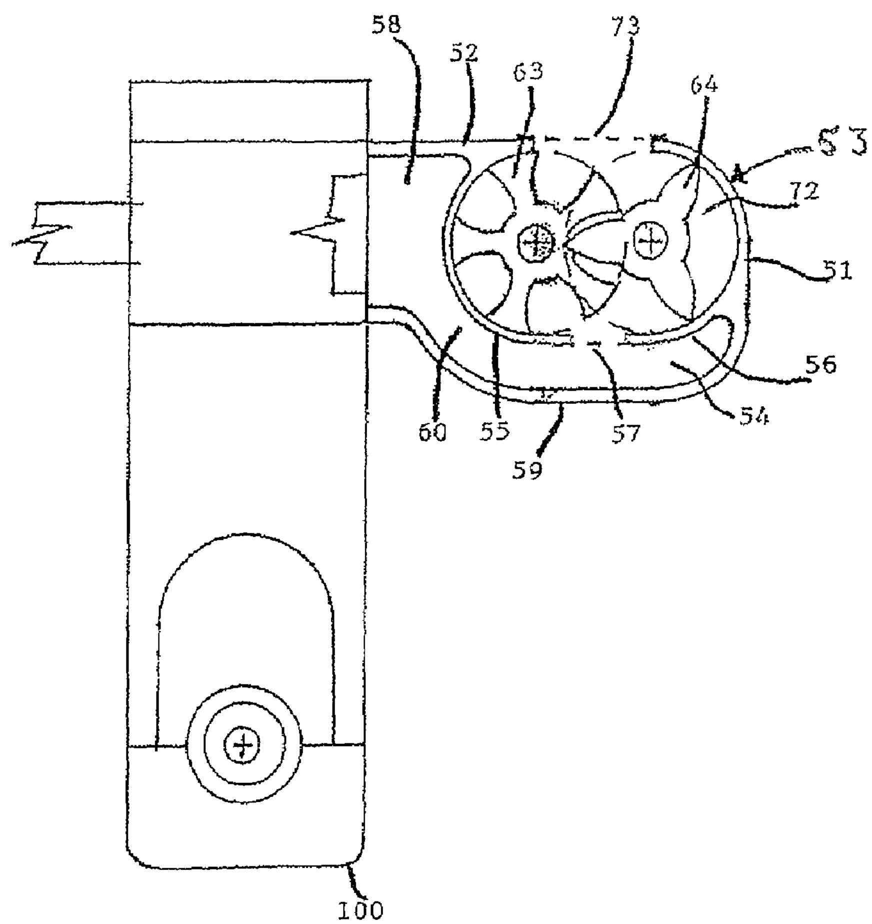
FIG. 4 shows an in-line engine configuration incorporating an apparatus having a supercharger and manifold according to a second embodiment of the present invention.

Because for an in-line configuration engine the inlet manifold 12 does not have diverging inlet passages, the apparatus according to the present invention shown in FIG. 4 has a different configuration to the V-engine configuration shown in FIG. 3. It should be noted that as with FIG. 1 the inlet manifold 12 has a number of generally parallel inlet passages depending upon the number of cylinders for the engine.

Likewise the apparatus in accordance with the present invention has a number of parallel intake passages to the ones shown in FIGS. 3 and 4.

In FIG. 4 an apparatus 51 is shown in which an inlet manifold 52 is combined with a supercharger 53.

The inlet manifold 52 has an entry end in the form of an entry chamber 54 which incorporates the supercharger 53. The supercharger occupies most of the chamber 54 but in a similar fashion to the configuration shown in FIG. 3, has common walls 55, 56 which terminate opposite each other to create a gap 57 opening to the bottom of the chamber 54.

The intake manifold 52 consists of a passage or passages 58 feeding from the left hand side of the chamber (in this embodiment, but could be right side or other side(s)) 54. In contrast to the configuration shown in FIG. 3 the chamber 54 has a lower wall 59 which is distended and follows the general shape of the bottom common walls 55, 56 of the supercharger 53.

A passage 60 is created between the bottom common wall 55 of supercharger 53 and the lower wall 59 of chamber 54. This passage 60 feeds into the intake passage (s) 58 of manifold 52.

The length of the passage 60 depends on how far the compressor 53 extends into the passage 58. Thus by moving the compressor 53 upwardly the wall 59 would not need to be as distended and the length of the passage 60 could be reduced.

As with the apparatus 30 shown in FIG. 3 compressed air leaving the supercharger 53 passes through the gap 57 and down and around common wall 55 through passage 60 into passage 58 and then into the engine cylinders.

Air is drawn into the supercharger compartment 72 from above the apparatus 51 through an intake gap 73. Air may also be drawn in from either end of the compartment 72.

The rotors are designated by items 63 and 64.

The shape of the manifold 52 and 32 may be changed so that there is a more continuous, more streamlined structure to the passages 45, 39; 46, 40 and 60, 58. Thus as an example even though as shown the top walls of the intake manifolds 32, 33 and 52 meet an approximate midpoint of the outer side(s) of the supercharger 34, 53, the configuration of the manifold walls of the intake passages may be contoured to meet the lower part of the common wall to allow for a more streamlined expansion of the passage width from the outlet gap leading from the supercharger.

According to another embodiment of the invention the supercharger compartment 72 is located at the bottom of the chamber 54 so that air is forced out of the supercharger compartment 72 through a gap in the top of the compartment 72 and out around the left hand side wall of the compartment 72 (in the drawing shown) and into the inlet passage 58.

In some circumstances it may also be possible to have the outlet from the super charger compartment 72 through a side wall into the chamber 54 and into inlet passage 58. This is also possible for the previous embodiments described. For example an air inlet to the supercharger compartment 72 may be located at one end and the outlet at the other.

It should be noted that although the embodiments have been described primarily with regard to superchargers and supercharger components in the apparatus, the invention is equally applicable to other devices for compressing air or forcing air into an air intake for an engine.

It is also noted that although the above embodiments have been described having regard to superchargers connected to air intakes, the apparatus may be configured to incorporate a compressed air and fuel mixture.

From the above it should be clear that the apparatus described provides a combined supercharger and inlet manifold which makes it possible to minimise the space required above the engine in order to incorporate a supercharger.

Although other engine configurations have not been described, the apparatus in accordance to the present invention is equally applicable to other engine types. Furthermore the apparatus described may incorporate additional components in addition to those described.

The embodiments of the invention which have been described with reference to FIGS. 3 and 4 are based on a single pair of rotors being located within the inlet housing of a manifold. According to other embodiments of the present invention additional rotors may be incorporated to provide a second and third pair of rotors, optionally in line and driven by the first pair thus increasing the supercharger displacement and/or creating a supercharger with a high compression or boost capability. In such embodiments the supercharger can be referred to as a quad rotor and/or a triple rotor design. These rotors can be of a similar design to the embodiments described above or may incorporate a special design of reverse rotation to enable an even dispersal of air throughout the inlet chamber. The chamber in such embodiments would then have dual or triple outlets to accommodate the additional rotors.

The embodiments described above may be modified so that the additional rotors include additional intakes top or rear of the intake housing.

It should be understood that the term rotor includes a single pair or pair of rotors as well as multiple sets or pairs of rotors. These rotors may be of a standard screw type design such as a of a male and female pair, that pair being of a three on five or four on six configuration and/or a combination of two or more lobes.

It is also to be understood that lobes includes veins and/or blades, rotor lobes or blades or veins or any other formation extending radially from a central axial area.

The rotor lobes may be of a convex surface design or convex and concave design to accommodate the intersection of the lobes on each of the paired rotors. The intersecting lobes should be configured to create a device capable of compressing air.

The dimensions of the rotors may vary depending upon the amount of air required for the application concerned. Furthermore, the amount of helix or twist/screw of the rotor lobes will also depend on the desired use and compression or air/gas required for the application. Thus other air mixtures and gas mixtures are also contemplated to increase the performance of the apparatus.

According to another embodiment of the present invention a bypass system may incorporate a valve system incorporating one or more valves. These may be of a butterfly type.

Preferably the valves are positioned between the incoming air and compressed or neutral air of the inlet chamber.

The bypass system incorporating a valve system may be controlled by a number of different methods including an engine vacuum, or mechanical and/or digital control systems.

Preferably the controlling system has a primary function for bypassing air into the engine at part or no throttle engine operations. This air desirably circumvents the rotor assembly and roots air directly into the inlet chamber and flows into the inlet.

According to one embodiment of the invention the apparatus may be cooled using a cooling system. The cooling system may incorporate cooling water or other cooling or heat dispersal liquid or an air intercooler placed within the confines of the air chamber/passages 39, 40, 58 of the manifold prior to the inlet runner.

According to another method of cooling a water jacket may be located between the compression area of the rotor and the air chamber thus creating a secondary common wall within the device and its confines. This water or other cooling or heat dispersal liquid may have its own radiator or pump separate from the engine or engines of the vehicle.

Provision of a water jacket thus creates a heat trap or barrier, which may encompass some or all of the surface area in which the desired cooling is required. It is preferred that the cooling jacket does not cover all of the common wall between the compression area and the inlet chamber.

It is to be understood that, if any prior art publication is referred to herein, such reference does not constitute an admission that the publication forms a part of the common general knowledge in the art, in Australia or in any other country.

The invention claimed is:

1. An apparatus for a vehicle comprising a compressor and manifold for connection to air inlets of an engine, wherein the manifold has an entry end chamber, the compressor device is located at least partially within the chamber, and wherein the entry end chamber comprises a discharge diffuser.

2. The apparatus as claimed in claim 1 including at least one common wall which partitions compressor loads of the compressor from an intake passage of the manifold.

3. The apparatus as claimed in claim 1 including a first and second common wall.

4. The apparatus as claimed in claim 3 wherein at least one common wall is curved.

5. The apparatus as claimed in claim 4 wherein at least one common wall forms at least part of a passage for airflow with an opposing wall of the manifold.

6. The apparatus as claimed in claim 1 wherein the compressor device comprises one of a super charger and turbo charger.

7. The apparatus as claimed in claim 1 wherein the compressor device comprises a super charger with a compression chamber having compressor lobes located therein.

8. The apparatus as claimed in claim 7 wherein the super charger comprises compression chamber walls.

9. The apparatus as claimed in claim 8 wherein the compression chamber walls include common walls.

10. The apparatus as claimed in claim 9 wherein the common walls comprise first and second walls.

11. The apparatus as claimed in claim 10 wherein the super charger has an outlet located between the first and second common walls.

12. The apparatus as claimed in claim 10 wherein the first and second common walls have outer ends which oppose each other.

13. The apparatus as claimed in claim 12 wherein each outer end is located below the respective central axis of rotation of the compressor lobes.

14. The apparatus as claimed in claim 13 wherein the outlet comprises an opening at a lower part of the entry end chamber.

15. The apparatus as claimed in claim 14 wherein each compressor rotor comprises a shaft, and wherein the shafts of each compressor rotor are located inside the entry end chamber.

16. The apparatus as claimed in claim 14 wherein the outlet comprises an opening to a lower part of the entry end chamber.

17. The apparatus as claimed in claim 16 wherein each compressor lobe comprises an axel, and wherein the axles of each compressor lobe are located inside the entry end chamber.

18. The apparatus as claimed in claim 17 wherein the first and second common walls are located adjacent a lower wall of the entry end chamber.

19. The apparatus as claimed in claimed 12 wherein an upper wall of the super charger lobes comprises an upper wall of the entry end chamber.

20. The apparatus as claimed in claim 19 wherein the outlet gap is located above a substantially horizontal wall section of the entry end chamber.

21. The apparatus as claimed in claim 1 wherein the first and second common walls terminate in outer ends which face each other.

22. The apparatus as claimed in claim 21 wherein the outlet gap located between the outer ends of the common walls has a width which is less than the distance between the centers of each compressor rotor.

23. The apparatus as claimed in claim 22 wherein the width of the outlet gap is less than half the distance between the centers of the compressor lobes.

24. The apparatus as claimed in claim 1 wherein the entry end chamber has a plurality of exit passages leading to an exit outlet for connection to air intakes of an engine.

25. The apparatus as claimed in claim 24 wherein the exit passages diverge in opposite directions.

26. The apparatus as claimed in claim 24 wherein each of the exit passages extend in the same direction as the other exit passages.

27. The apparatus as claimed in claim 24 wherein the cross-sectional area of the entry end chamber is greater than the cross-sectional area of the/each exit passage.

28. The apparatus as claimed in claim 1 wherein the entry end chamber has a lower wall which is generally concave.

29. The apparatus as claimed in claim 1 wherein the discharge diffuser comprises an enlarged area diffuser comprising passages extending from an outlet of the compressor device, around part of the outer wall of a rotor compartment of the compressor and an air inlet passage leading to cylinders of the engine.

30. A vehicle comprising a compressor apparatus comprising a compressor device and manifold for connection to air inlets of an engine of the vehicle, wherein the manifold has an entry end chamber, the compressor device is located at least partially within the chamber, and wherein the entry end chamber comprises a discharge diffuser.

31. The vehicle as claimed in claim 30 wherein the compressor device comprises a super charger having a top surface located below a top surface of the engine.

32. The vehicle as claimed in claim 30 wherein the compressor apparatus is located below the hood or bonnet of an engine compartment of a vehicle.

33. The vehicle as claimed in claim 30 wherein the compressor device comprises compressor lobes which are located in a compressor chamber located at least partially within an inlet chamber of the manifold.

* * * * *

UNITED STATES PATENT AND TRADEMARK OFFICE

CERTIFICATE OF CORRECTION

PATENT NO. : 7,694,667 B2
APPLICATION NO. : 11/503490
DATED : April 13, 2010
INVENTOR(S) : Williams et al.

It is certified that error appears in the above-identified patent and that said Letters Patent is hereby corrected as shown below:

Title Page
Please insert Item (63) and Item (30):

--Related U.S. Application Data:

(63) Continuation of application No. PCT/AU06/00377, filed on March 22, 2006--

--(30) Foreign Application Priority Data:

March 30, 2005 AU......... 2005-901452--

Signed and Sealed this

Twenty-second Day of June, 2010

David J. Kappos
*Director of the United States Patent and Trademark Office*